United States Patent [19]

Stewart

[11] 3,888,761

[45] June 10, 1975

[54] H-OIL PROCESS

[75] Inventor: Norman C. Stewart, Lake Charles, La.

[73] Assignee: Cities Service Research & Development Co., New York, N.Y.

[22] Filed: June 20, 1973

[21] Appl. No.: 371,792

Related U.S. Application Data

[63] Continuation-in-part of Ser. No. 88,764, Nov. 12, 1970, abandoned.

[52] U.S. Cl. ................. 208/112; 208/108; 208/157
[51] Int. Cl. ......................... C10g 1/08; C10g 13/00
[58] Field of Search ..................... 208/112, 108, 158

[56] References Cited
UNITED STATES PATENTS

| | | | |
|---|---|---|---|
| 3,275,546 | 9/1966 | Retallick | 208/108 |
| 3,412,010 | 11/1968 | Alpert et al. | 208/112 |
| 3,519,555 | 7/1970 | Keith et al. | 208/10 |
| 3,541,002 | 11/1970 | Rapp | 208/143 |
| 3,556,984 | 1/1971 | Van Driesen | 208/59 |
| 3,565,589 | 2/1971 | Stewart et al. | 23/289 |
| 3,617,524 | 11/1971 | Conn | 208/157 |

Primary Examiner—Delbert E. Gantz
Assistant Examiner—G. E. Schmitkons
Attorney, Agent, or Firm—George L. Rushton

[57] ABSTRACT

A process and apparatus are shown for the improved utilization of catalysts in a hydrocracking system. The method comprises passing a hydrocarbon oil feedstock, preferably a heavy hydrocarbon residuum, upwardly through a particulate catalyst bed in a reaction zone maintained at high temperature and high pressure, together with hydrogen-containing gas; recycling a portion of the upwardly flowing oil together with a portion of the particulate catalyst to the bottom of the reaction zone while simultaneously pulverizing the minor proportion of the particulate catalyst to a fine powdered catalyst; and passing the recycled oil and finely powdered catalyst upwardly through the particulate catalyst bed in the reaction zone, with at least a portion of the powdered catalyst leaving the reactor with the treated effluent. Apparatus for practicing this process comprises a reactor vessel having a vertically mounted recycle conduit mounted therein, and pulverizing means, preferably a modified axial turbine high-shear mixer communicatingly connected to the bottom of the recycle conduit, for pulverizing recycled particulate catalyst to a fine powdery catalyst. Additionally, a pump is mounted to the outlet of the high-shear turbine mixer to provide positive fluid flow.

7 Claims, 1 Drawing Figure

H-OIL PROCESS

CROSS-REFERENCE TO RELATED APPLICATION

This application is a continuation-in-part of the copending and related application having Serial Number 88,764, filed November 12, 1970, now abandoned.

BACKGROUND OF THE INVENTION

This invention relates to a process and apparatus for the more effective utilization of particulate catalyst in the hydrocracking of hydrocarbon oils. More particularly, this invention is directed to a process and apparatus for the improved hydrocracking, hydrogenation, hydrodesulfurization, and hydrodenitrogenation of residuum while making more effective use of catalysts for the same.

Solid particulate catalyst has for many years been an essential feature in the processing of petroleum and hydrocarbon oils. A recent development which is particularly useful in the catalytic hydrorefining of high boiling oils such as vacuum and atmospheric residuums utilizes what is known as an ebullated bed. An ebullated bed is one in which a bed of extruded or pelleted catalyst particles is expanded up to five times its original size by the upward flow of hydrocarbons and other reactants through the bed. Such a system is described in U.S. Pat. No. Re.25,770, issued Apr. 22, 1965 to D. S. Johanson, for gas-liquid contacting process.

Attempts to regenerate catalysts used in such processes, that is, residual hydrorefining, have been unsuccessful. While it is well known that carbonaceous material or coke deposited on the catalyst can be removed by controlled combustion, with or without washing, the regeneration of the catalyst used in this particular residual hydrorefining system has been prevented by the inability of the regenerative process to remove various metal catalyst poisons, such as vanadium, which are deposited on the catalyst from the feedstock during the processing. Attempts at selectively dissolving these metal catalyst poisons have been unsuccessful.

Examination of the spent catalyst indicates that the catalyst particle internally is in its original state and that after removal of coke there still remains a shell of metallic oxide poisons encasing the substantially fresh core of the particle. Mechanical removal by attrition of the shell appears to be impractical since the catalyst has to be withdrawn from the hydrocracking system and then subjected to severe and controlled attrition. Chemical treatment of the spent catalyst to remove the metallic poisoning agents has also been considered but also is found to be relatively ineffective. At present, therefore, the catalyst, after becoming spent, has to be discarded, and as a result this increases the cost of the process in which it is employed.

SUMMARY OF THE INVENTION

Accordingly, I have invented a process and apparatus for the the improved utilization of particulate catalysts employed in the hydrorefining of residual oils. The process comprises treating a residual hydrocarbon oil with hydrogen in the presence of an expanded bed of particulate catalyst by passing the oil and hydrogen upwardly through the expanded catalyst bed in a reaction zone maintained under conditions of high pressure and temperature, wherein the liquid reactant from above the catalyst bed is recycled to below the bed. The improvement comprises recycling a minor portion of the particulate catalyst which is carried over with the recycled liquid reactant and pulverizing the carried-over particulate catalyst to a fine powder, prior to returning the recycled liquid reactant and pulverized catalyst to below the catalyst bed in the reaction zone. The pulverized catalyst, or a portion thereof, is then removed from the reactor with the liquid effluent. Apparatus for recycling and pulverizing the particulate catalyst comprises a reactor vessel, a vertically mounted recycle conduit mounted in the vessel, and a means for pulverizing particulate catalyst communicatingly connected to the recycle conduit. Preferably a pump is communicatingly connected to the pulverizing means at the outlet thereof.

It is, therefore, an object of the present invention to provide an improved process for treating a heavy hydrocarbon oil with hydrogen in the presence of a catalyst.

It is another object to this invention to provide an improvement in a process and apparatus for treating residual oil by converting spent particulate catalyst during the process into a catalytically active form.

Still another object of the present invention is to provide means for continually converting spent catalyst into a conveniently useful form.

Another object is to provide means for removal of spent particulate catalysts.

Other objects and advantages of the present invention will be apparent to those skilled in the art from the brief description of the preferred embodiments and drawings which follows:

DESCRIPTION OF THE PREFERRED EMBODIMENTS

Figures 1, 2:
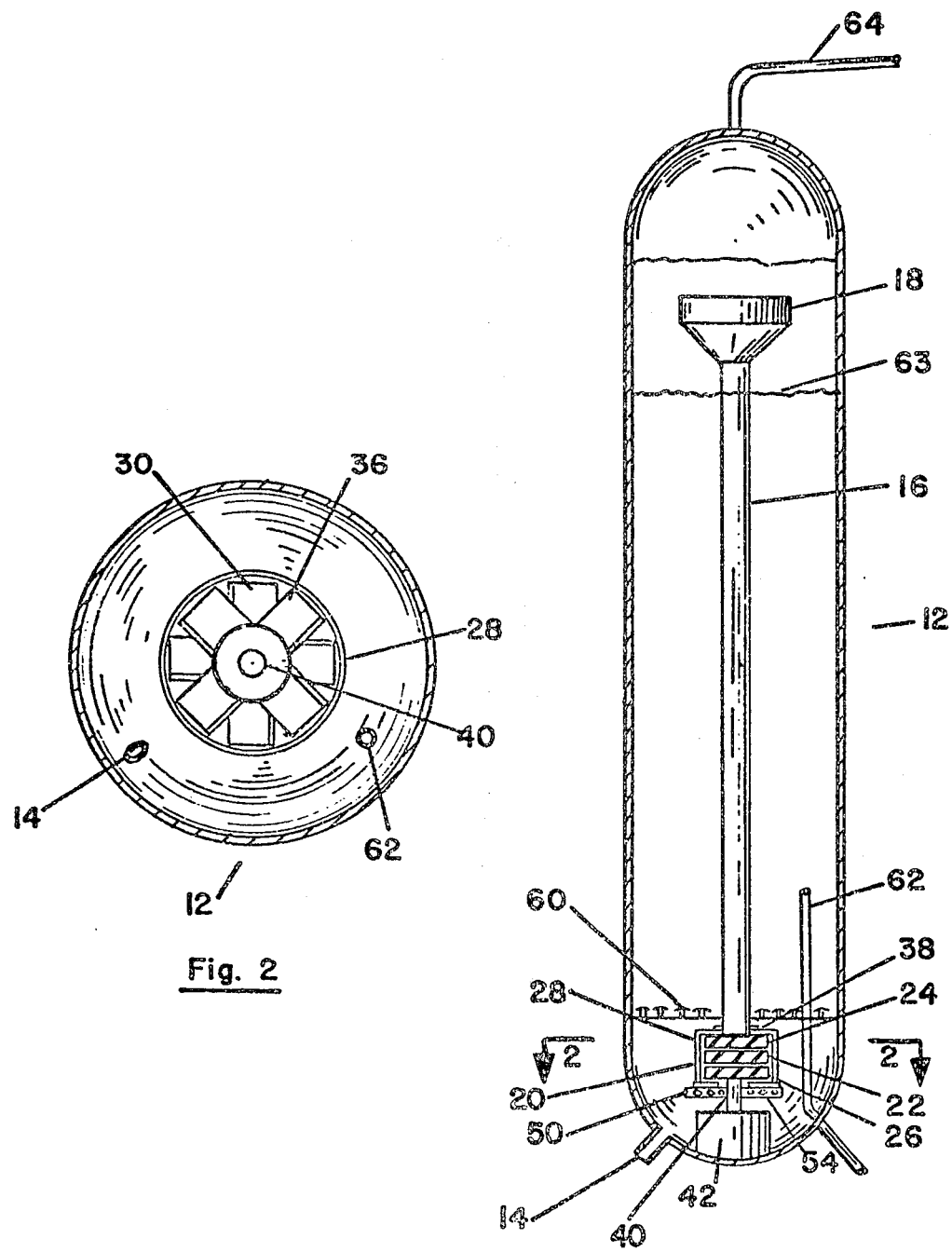
FIG. 1 of the drawings shows in simplified form a reactor vessel with internal recycle according to the present invention.
FIG. 2 is a more detailed view of the high-shear turbine pulverizer incorporated in the reactor vessel shown in FIG. 1, taken along section 2—2.

Briefly, the process of this invention involves the utilization of relatively large particulate catalyst, either in pellet or extruded from. Specifically, the process in which the invention is applied is the high pressure, high temperature catalytic hydrotreatment of heavy hydrocarbon oil, such as vacuum and atmospheric residuum. The term hydrorefining is intended to cover those reactions in which a petroleum oil is contacted with substantially large volumes of hydrogen, as for instance 500 to 50,000 standard cubic feet of hydrogen per barrel of oil (SCF/bbl.), and which results in hydrocracking, hydrogenation, hydrodesulfurization, hydrodenitrogenation and other beneficial effects, such as metal removal, to the resulting oil products. Feedstocks which are particularly susceptible to such treatment are the aforementioned vacuum and atmospheric residuums, heavy gas oils, coker gas oils, high gravity crude oils, and other high boiling hydrocarbon oil fractions. Pressures employed in the process are in excess of 1000 psig and preferably in the range of 1500 psig to 3000 psig partial pressure hydrogen. Temperatures employed in the catalytic hydrorefining are in the range of from 650° to 950°F., with a temperature in the range of between 800° and 900°F. being preferred. Space velocity is maintained in the range of from 0.01 to 0.5 volumes of reactant per hour per volume of reactor per pound of catalyst. The space velocity is generally maintained by use of an internally mounted recycle conduit as will be hereinafter described. The reactants in the vessel pass upwardly through an expanded catalyst bed, dominated an ebullated catalyst bed, after which a portion of the liquid hydrocarbons, as well as any entrained particulate catalyst, are recycled back to the bottom of the vessel.

By ebullated bed, what is meant is a catalyst bed containing relatively large catalyst particles in the form of pellets or extrudates, ranging in size from about one-sixty-fourth inch to about three-eighths inch in diameter, with a typical L/D ratio of from about 2 to about 10, and more preferably from about one-thirty-second inch to one-fourth inch diameter, and being in an expanded state due to the upflow of fluids through the bed. The ebullated bed is therefore increased in volume in the reactor up to 5 times the quiescent catalyst volume, with the catalyst particles exhibiting a characteristic random motion, thereby substantially reducing coking and hot spots in the catalyst and promoting a more uniform reactor temperature.

Hydrorefining catalysts are well known and recognized in the petroleum industry. Such catalysts are typically particulate and inorganic in nature. The catalysts may be metals, or their oxides or salts, or they may be non-metallic oxides or salts. The metallic constituents are typically deposited on inorganic substrates. Some representative metallic catalysts are nickel, cobalt, molybdenum, chromium, tungsten, vanadium, and palladium, either alone or in combination, and usually in oxide form, although the sulfides are also used. Examples are chromium oxide, nickel sulfide, cobalt oxide, vanadium oxide, cobalt oxide-molybdenum oxide, cobalt-molybdenum, tungsten sulfide, mixed oxides of iron and chromium, nickel molybdate, mixed sulfides of nickel and tungsten, platinum and palladium. The substrates include alumina, silica, kieselguhr, magnesia, ferric oxide and combinations such as alumina-silica. A preferred hydrotreating particulate catalyst is a mixture of cobalt oxide and molybdenum oxide on alumina. The details of the preparation of these catalysts are well known in the industry and need not be repeated here.

According to the present invention process, prior to or while being returned to the bottom of the reactor vessel, the mixed recycle oil and particulate catalyst are subjected to pulverizing action which reduces the entrained particulate catalyst to a fine powdery solid in the size range of from 300 to 600 microns and more preferably in the range of from 300 to 400 microns. The proportion of hydrocarbon oil recycled is on the order from 50 to about 300% of the rate of fresh feed into the reactor and, as such, results in an upward fluid velocity through the ebullated bed sufficient to maintain the particulate catalyst in an expanded condition.

The pulverizing of the particulate hydrorefining catalyst has at least two effects. First, fresh catalyst surface is exposed and is available when the pulverized catalyst and the hydrocarbon oil flow upwardly through the reactor. Second, at least a portion of the pulverized catalyst is removed from the reactor as a component of the treated liquid effluent stream, thus offering a feasible method of maintaining a balanced catalyst bed. Typical methods of adding particulate catalyst to an ebullated bed reactor are described in U.S. Pat. No. 3,541,002, issued Nov. 17, 1970 to Lester M. Rapp and in U.S. Pat. No. 3,565,589, issued Feb. 23, 1971 to N. C. Stewart and L. M. Rapp. The present invention offers a method of removing spent catalyst, thus maintaining a catalyst balance.

With reference to the accompanying drawings, a high pressure, high temperature cylindrically shaped reactor vessel 12 is shown. Attached to the bottom of the reactor vessel 12 is a feed conduit 14 which is used to introduce the reactants into the vessel 12, these being preferably a heavy hydrocarbon oil residuum and a hydrogen-containing gas. Vertically mounted inside the reactor 12 is a recycle conduit 16 with an upper funnel-shaped downcomer head 18 at its top and a pulverizer 20 connected to its bottom.

The pulverizer 20 is a modified axial turbine high-shear mixer having a single fixed stator 22 and two rotors 24 and 26, the stator being mounted between the rotors, and all three being axially mounted one above the other within a casing 28. The stator is constructed of four horizontally placed blades 30, each of the blades being attached at their distal ends to the inside wall of the casing 28. The inner ends of the blades 30 are formed as parts of a unitary ring 32 having an internal clearance hole. The upper rotor 24 is mounted axially above the stator and is a four blade propeller comprising four equally spaced blades 36 attached to central hub 38. The hub 38 is in turn mounted on a vertical shaft 40 which extends downward through the clearance hole in the stator to a motor 42 mounted in the bottom of the reactor vessel 12. The lower rotor 26 is identical in construction to the upper rotor 24 and is also mounted on the shaft 40 below the stator. The lower rotor has four equally spaced blades (not shown) pitched in the same manner as the blade of the upper rotor. The lower rotor blades are centrally attached to a lower rotor hub 46, which is fixedly mounted to the shaft 40 below the stator. Attached to the bottom of the pulverizer is a horizontally mounted centrical pump 50 having an intake, not shown, connected to the pulverizer and radially located outlets 54.

In the vessel 12, above the level of the pump, a one-way directional tray or grid such as bubble cap tray 60 is transversely mounted and operates to allow upward flow only through the tray and into the reaction zone of the vessel. A liquid-solid draw-off conduit 62 extends into the vessel from the bottom thereof, through the bubble cap tray 60 and has an opening in the vessel a spaced distance above the tray 60. Opening into the upper part of the vessel is an effluent withdrawal conduit 64 which passes through the top of the vessel and conveys effluent to a point downstream for further processing, not shown, such as gas-liquid separation.

An ebullated catalyst bed 63 is established in the vessel 12 above the tray 60 and has an indefinite upper boundary with the catalyst particle density being measurably reduced as the downcomer head 18 opening is approached. The liquid in the reactor vessel 12 is maintained at a level 66 as a gas-liquid interface above the downcomer head 18. Liquid reactant therefore readily enters the recycle conduit while only a minor portion of the particulate catalyst from the ebullated bed is carried over by entrainment in the liquid. The amount of entrained particulate catalyst can, of course, be controlled by either increasing the space velocity or by increasing the amount of catalyst particles in the ebullated bed 63.

The process of the invention is illustrated by the following example:

A two-reactor system was used for hydroprocessing a mixed feed of 90 wt. % West Texas sour vacuum bottoms and 10 wt. % fluid catalytic cracking unit cycle oil. The reactors were upflow, ebullated bed essentially as described in the drawing, using a high activity hydrocracking extrudate catalyst of cobalt molybdate on alumina, approximately one-thirty-second inch in diameter, with an L/D ratio ranging from 2 to 6. Fresh catalyst was added to, and spent catalyst was removed from, each reactor. A fluid rate of 6000 BPD was put through the 2500 BPD unit, giving a shortened residence time.

The total feed properties were:

| | |
|---|---|
| API° | 10.9 |
| Wt. % Sulfur | 3.24 |
| Vol. % 975°F. + | 69.0 |
| Carbon Residue | 12.15 |

The gas feed was:

| | |
|---|---|
| Total Gas, MSCFD | 4600 |
| $H_2$, MSCFD | 3700 |

The yields on fresh feed were:

| | Wt.% | Vol.% |
|---|---|---|
| Gas | 6.4 | |
| $C_4$ — 325°F | 4.3 (0.1Wt% S) | 5.9 |
| 325°F.+ | 92.8(1.43wt% S) | 96.1 |
| (975°F.+) | | (48.0) |
| | 103.5 | 102.0 |
| Operating Conditions | | |
| $H_2$ Recycle, MSCFD | 8700 | |
| $P_{H_2}$, psi | 2200 | |
| $H_2$/oil ratio, SCF/bbl fresh feed | 2065 | |
| Total pressure, psi | 2900 | |
| Reaction Temp. °F. | | |
| 1st Reactor | 790 | |
| 2nd Reactor | 805 | |
| Catalyst addition rate (to both reactors) | 400 lbs./day | (0.067 lbs./bbl.) |
| % Desulfurization | 58.9 | |
| % Conversion 975°F.+ | 30.4 | |

In operation, fresh hydrocarbon feed and hydrogen-containing gas were introduced into the first reactor by conduit 14, while particulate catalyst was added by an addition pipe, not shown. When an ebullated catalyst bed level, shown at 63, was reached, catalyst withdrawal was started, through 62. It is to be noted that, of the 200 lbs. of catalyst added to reactor No. 1 each day, about 60 lbs. would be removed from the reactor in the effluent, typically in the form of "fines". These fines are distinguished from and separate from the "pulverized" catalyst produced by pulverizer 20. The remaining 140 lbs. of catalyst from reactor No. 1 were removed through the aforementioned discharge pipe 62, thus maintaining a catalyst balance in reactor No. 1.

Typically, the operation in reactor No. 2 was similar, concerning the catalyst. The fines from No. 1 were not calculated as fresh catalyst feed from No. 2 and would depart from reactor No. 2 with the treated effluent, along with approximately 60 lb. of fines introduced as a part of the daily 200 lbs. of fresh catalyst feed for No. 2.

The invention was tested as follows: catalyst discharge through 62 of reactor No. 2 was stopped, and recycle of the reactor contents was increased until enough catalyst entered conduit 16, was pulverized in pulverizer 20 and was removed with effluent through conduit 64 so as to maintain the catalyst balance.

The yields on fresh feed, and the operating conditions, were similar before, during and after the change from the usual method of catalyst withdrawal, thus showing utility of the method.

While the present invention has been described herein with reference to particular embodiments thereof, it will be appreciated by those skilled in the art that various changes and modifications can be made without departing from the scope of the invention as set forth.

I claim:

1. A method for catalytically treating a hydrocarbon comprising passing a heavy hydrocarbon oil feedstock upwardly through a particulate hydrorefining catalyst bed in a reaction zone, said particulate catalyst being at least one-sixty-fourth inch in size, recycling a portion of the upwardly flowing oil together with a minor portion of the particulate catalyst to the bottom of the reaction zone, simultaneously pulverizing at least a portion of the recycled particulate catalyst to a fine powder in the size range of between about 300 and about 600 microns, passing the recycled oil and finely powdered catalyst upwardly through the reaction zone, and removing an effluent stream of treated oil and powdered catalyst from the reaction zone.

2. The method of claim 1 wherein said hydrocarbon oil is a residual oil and said particulate hydrorefining catalyst is a hydrocracking catalyst.

3. The method of claim 2 wherein said reaction zone is maintained at temperatures in excess of 650°F. and pressures in excess of 1000 psig and wherein the catalyst is an extrudate of cobalt molybdate on alumina.

4. The method of claim 3 in which the recycling and pulverizing take place internally of the reactor.

5. In a method for catalytically hydrotreating a heavy hydrocarbon oil comprising passing a mixture of a heavy residual oil and hydrogen upwardly through an ebullated bed of particulate hydrocracking catalyst, in a reaction zone, said particulate catalyst being at least one-sixty-fourth inch in size, under conditions of about 1000–3000 psig and about 650°–950°F., recycling at least a portion of the reaction mixture to the bottom of the reaction zone, and withdrawing effluent from the upper portion of the reaction zone, the improvement which comprises:

pulverizing, simultaneously with the recycling step, at least a portion of the recycled particulate catalyst to a fine powder in the size range of from about 300 to about 600 microns, passing the recycled oil, hydrogen and powdered catalyst upwardly through the reaction zone, and removing an effluent stream of treated oil, hydrogen and powdered catalyst from the reaction zone.

6. The method of claim 5 in which the recycling and pulverizing take place internally of the reactor.

7. The method of claim 5 in which the particulate hydrotreating catalyst is an extrudate of cobalt molybdate on alumina.

* * * * *